A. J. HALL AND P. L. MARDIS.
SYSTEM OF CONTROL.
APPLICATION FILED FEB. 25, 1919.

1,365,317.

Patented Jan. 11, 1921.
4 SHEETS—SHEET 1.

WITNESSES:
H. J. Shelhamer
W. R. Coley

INVENTORS
Arthur J. Hall
Paul L. Mardis
BY
Wesley G. Carr
ATTORNEY

A. J. HALL AND P. L. MARDIS.
SYSTEM OF CONTROL.
APPLICATION FILED FEB. 25, 1919.

1,365,317. Patented Jan. 11, 1921.
4 SHEETS—SHEET 3.

INVENTORS
Arthur J. Hall
Paul L. Mardis

UNITED STATES PATENT OFFICE.

ARTHUR J. HALL, OF PITTSBURGH, AND PAUL L. MARDIS, OF SWISSVALE, PENNSYLVANIA, ASSIGNORS TO WESTINGHOUSE ELECTRIC & MANUFACTURING COMPANY, A CORPORATION OF PENNSYLVANIA.

SYSTEM OF CONTROL.

1,365,317.  Specification of Letters Patent.  Patented Jan. 11, 1921.

Application filed February 25, 1919. Serial No. 279,032.

*To all whom it may concern:*

Be it known that we, ARTHUR J. HALL, a subject of the King of Great Britain and a resident of Pittsburgh, in the county of Allegheny and State of Pennsylvania, and PAUL L. MARDIS, a citizen of the United States, and a resident of Swissvale, in the county of Allegheny and State of Pennsylvania, have invented a new and useful Improvement in Systems of Control, of which the following is a specification.

Our invention relates to systems of control for dynamo-electric machines and especially to the complete control operation of a plurality of electric motors that are adapted for both acceleration and regeneration.

Generally stated, the object of our invention is to provide a control system of the above-indicated character which shall embody various novel and advantageous control arrangements, more particularly with respect to the auxiliary or secondary control system.

The various specific objects of our invention will become apparent from the following detail description, taken in conjunction with the appended claims and with the accompanying drawings, wherein

Figure 1:
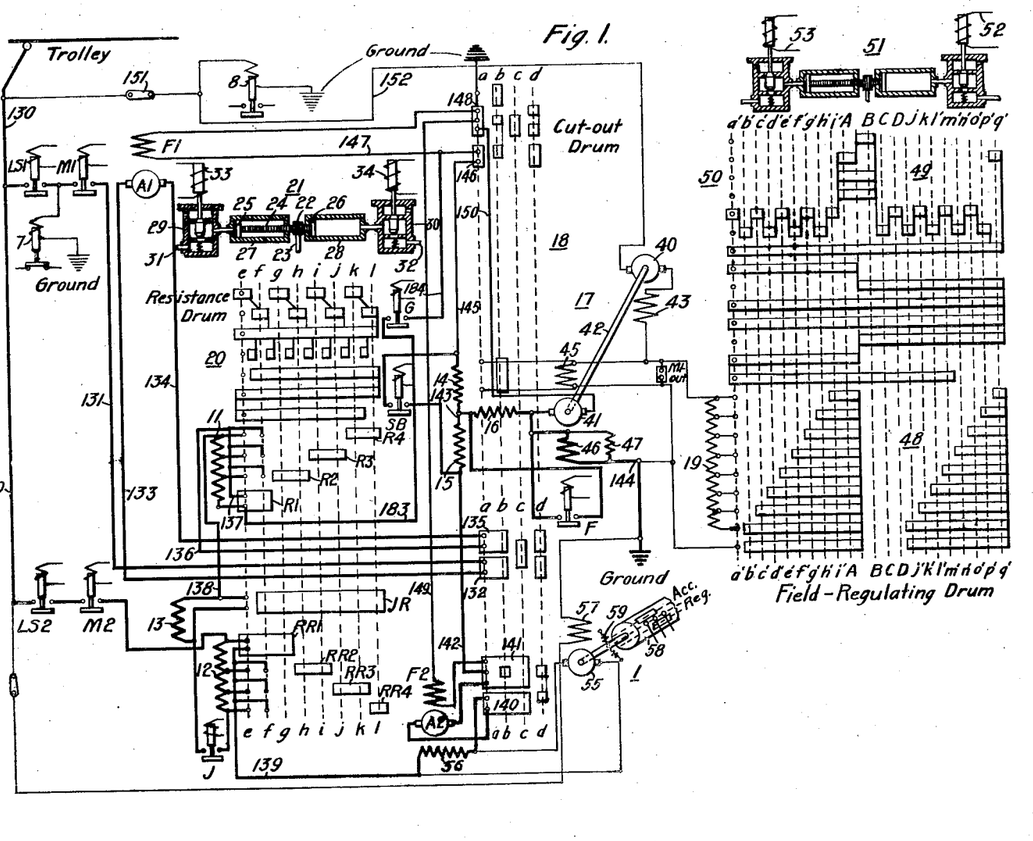
Figure 1 is a diagrammatic view of the main circuits of a system of control embodying our invention.

Referring to Fig. 1 of the drawings, the system shown comprises a plurality of suitable supply-circuit conductors respectively marked "Trolley" and "Ground;" a plurality of dynamo-electric machines respectively having commutator-type armatures A1 and A2 and field-magnet windings F1 and F2 of the familiar heavy-coil series form; a plurality of accelerating resistors 11, 12 and 13 which are governed by a resistance drum 20 having an operating mechanism 21; a plurality of stabilizing resistors 14 and 15 for a purpose to be described; a further main-circuit resistor 16 that is employed for regulating purposes; a motor-generator set 17 that is driven from the supply circuit to furnish exciting energy to the main field windings; a cutout drum 18 for arranging certain of the motor circuits; an auxiliary-circuit resistor 19 for regulating the action of the motor-generator set 17; a second controller 50 which may be termed the field-regulating drum; a plurality of unit switches LS1, LS2, M1, M2, J, G, SB and F for arranging certain of the main motor groupings or combinations; and a plurality of relay devices of various types 1, 7 and 8 for effecting certain automatic operations to be described.

The accelerating resistor 11 is provided with stationary terminal members so located with respect to a plurality of contact segments, cams, or the equivalent, R1, R2, R3 and R4, that the resistor is gradually short-circuited as the resistance drum 20 successively occupies its positions *e* to *l*, inclusive or vice versa. The corresponding resistor 12 is similarly associated with a plurality of contact segments, or the like, RR1, RR2, RR3 and RR4 to short-circuit sections of the resistor 12 alternately to the exclusion from circuit of portions of the resistor 11.

The operating mechanism 21 for the resistance drum 20 is of the electrically-controlled, pneumatically-actuated type comprising a pinion 22 which is rigidly secured to one end of the operating shaft 23 for the resistance drum and which meshes with a horizontally-movable rack member 24, the opposite ends of which constitute pistons 25 and 26 traveling within suitable cylinders 27 and 28, respectively. A pair of valves 29 and 30 are normally open to admit fluid pressure from any suitable source (not shown) through pipes or passages 31 and 32, respectively, and, in the closed position of the valves, when the respective actuating coils 33 and 34 are energized, fluid pressure is exhausted from the corresponding operating cylinder, through the valve, to the atmosphere.

The operation of the actuating mechanism 21, without regard to the electrical connections effected thereby, may be briefly set forth as follows. Normally, high-pressure air or other fluid medium is present in both operating cylinders 27 and 28 to maintain the mechanism and the resistance drum in any desired position, in this case, the "off" position. However, upon the energization of actuating coil 34, for example, fluid pressure is released from the corresponding cylinder 28, whereupon the unbalanced fluid-pressure conditions of the mechanism cause a movement of the pistons 25 and 26 toward the right and, therefore, of the resistance drum 20 toward the left. To arrest such movement at any time, it is merely necessary to deënergize the previously excited coil, while, to return the device to the illustrated "off" position, the opposite coil is energized and coil 34, in the case assumed, is deënergized to effect the reverse unbalancing of the fluid-pressure conditions.

The motor-generator set 17 comprises a driving armature 40 and a driven or generating armature 41, the two auxiliary armatures being suitably mechanically associated, as by a shaft 42. The driving armature 40 is provided with a series-related field winding 43, while one field winding 45 for the generating armature 41 is connected in series relation with the driving armature 40 and in shunt relation to the variable resistor 19. A second field winding 46 for the generating armature is permanently shunted by a resistor 47 and is traversed by a current that is proportional to the entire load current of the main vehicle-propelling machines.

The field-regulating drum 50 comprises a lower section 48 for regulating the active value of the auxiliary resistor 19 and an upper section 49 for interlocking or governing certain of the control circuits to be described in connection with Fig. 2.

An operating mechanism 51 for the field-regulating drum 50 is a counterpart of the previously-described operating mechanism 21 and has a plurality of actuating coils 52 and 53 for effecting forward movement from position $a'$ to position $q'$ and the reverse movement, respectively, when energized singly.

The cutout drum 18 normally occupies its position $a$ and is provided with three other operative positions $b$, $c$ and $d$. Normal position $a$ corresponds to separate excitation of the main field windings from the motor-generator set; while position $b$ permits straight series operation of the main motors, whereby the vehicle may be operated in an emergency when the motor-generator set fails; and in positions $c$ and $d$, the one or the other of the main motors, when disabled, may be excluded from circuit and vehicle operation continued, employing the motor-generator set 17 and the attendant circuits as before.

The relay device 1 is of the familiar torque-motor type comprising a commutator-type armature 55, which is connected across a suitable shunt 56 in series relation with the main armature A2; an exciting field winding 57, which is shown as connected across the supply-circuit conductors Trolley and Ground; and a drum, or the equivalent, 58, which is adapted to assume three positions, the two outer positions corresponding to accelerating and regenerative operation, respectively, and the device being biased to the intermediate "off" position by means of a plurality of centering springs 59.

The purpose of the relay device 1 is to weaken the field flux of the auxiliary exciting armature 41 during the regenerative period and to strengthen that field flux during the motoring operation of the main machines to automatically maintain a predetermined ratio of main armature and field-winding fluxes or ampere-turns and prevent "flash-over" conditions, and the like, which occur when the ratio mentioned exceeds a predetermined value.

The relay device 7 is of the solenoid type, having its actuating coil connected between line switch LS1 and ground. The purpose of this device is to disconnect the motors from the supply circuit in the event of overvoltage conditions, the device being designed to occupy its illustrated lower position throughout ordinary operation.

A similar relay device 8 is connected across the supply circuit and is employed for the purpose of preventing the closure of the line switches LS1 and LS2 if the motor-generator set 17 is not running.

Figure 2:
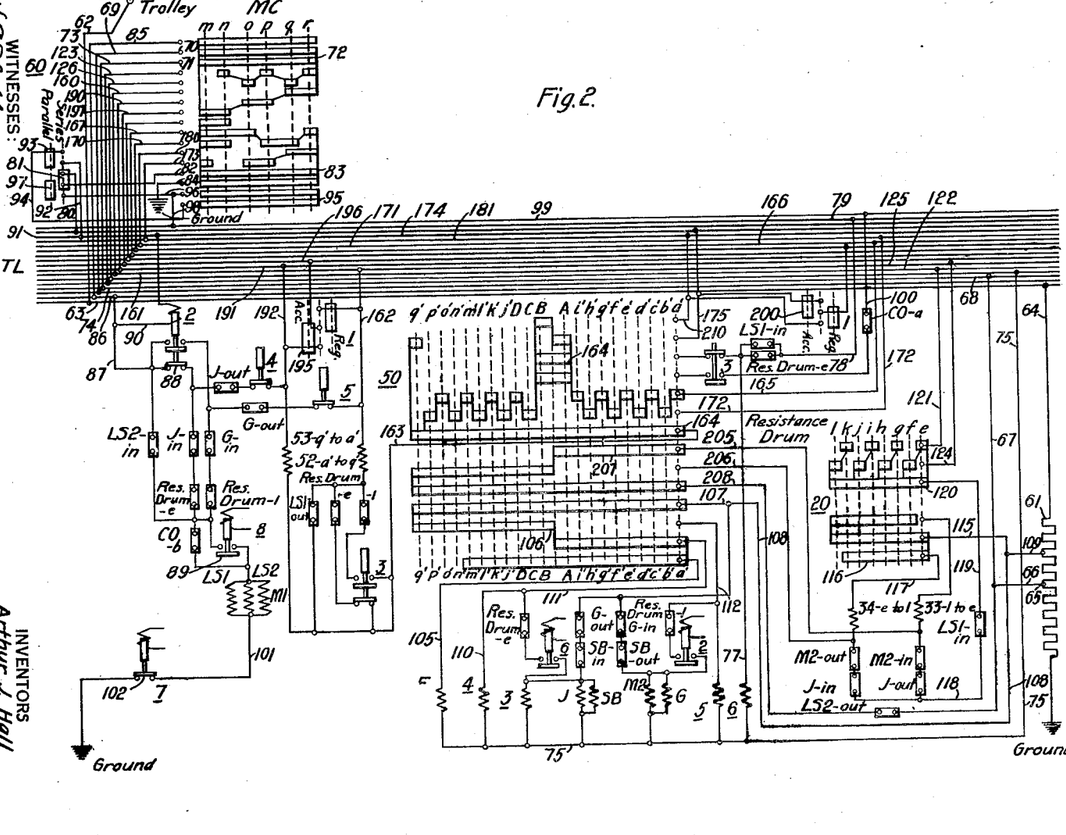
Fig. 2 is a diagrammatic view of the auxiliary or secondary circuits for governing the system that is shown in Fig. 1.

Reference may now be had to Fig. 2, wherein the auxiliary control sytsem illustrated comprises various actuating coils and contact members or interlocks of the several switches and relay devices previously mentioned; and also other relay devices 3 to 6, inclusive, together with the upper sections of the resistance drum 20 and the field-regulating drum 50; a control resistance 61 for furnishing suitable low-voltage energy to the control circuits; a master controller MC having operative positions $m, n, o, p, q$ and $r$; a series-parallel switch 60 for effecting different groupings of the main motors; and a plurality of train-line conductors TL. The switch-type interlocks are more fully illustrated in Fig. 4, which shows the familiar unitswitch construction.

Assuming that it is desired to effect acceleration of the illustrated main motors and that the motor-generator set 17 has previously been started into operation, the series-parallel switch 60 may be actuated to its "series" position and the master controller to its initial operative position $m$.

The chief or energizing auxiliary circuit is thereby established from the trolley through conductor 62, train-line conductor 63, conductor 64 and the control resistor 61 to ground.

A control circuit is thereupon established from an intermediate tap 65 of the control resistor through conductors 66 and 67, train-line conductor 68, conductor 69, control fingers 70 and 71, which are bridged by contact segment 72 of the master controller, conductor 73, train-line conductor 74, conductor 75, actuating coil of the relay device 6, conductor 77, auxiliary contact member or interlock marked "Res. drum—$e$", (signifying that the contact is made only in initial position $e$ of the resistance drum), whence circuit is continued through conductor 78, train-line conductor 79, conductor 80, contact member 81 of the series-parallel switch 60, conductor 82, contact segment 83 of the master controller and conductor 84 to ground. The closure of the relay device 6 is maintained independently of the position of the resistance drum as soon as the line switch LS1 is energized, in a manner about to be described, to bridge the interlock contact member Res. drum—$e$.

Upon the closure of the relay device 6, a further circuit is established from the positively-energized conductor 75 through the parallel-related actuating coils 3, J and SB, the relay device 6 in its closed or upper position, interlock or auxiliary contact member marked "Res. drum—$e$", conductor 111, contact segment 106 of the field-regulating drum 50, and conductors 107 and 108, to a second intermediate tap 109 of the control resistor 61.

The closure of the relay device 3 and of the switches J and SB is thereafter maintained independently of the position of the resistance drum by reason of a holding circuit including interlocks SB—in and G—out, which directly connects the actuating coils in question with conductor 107.

The switch F and the relay device 4 are also closed at this time by reason of the connection of the actuating coils thereof between conductor 75 and conductors 105 and 110, respectively, which are both connected to the contact segment 106 of the field-regulating drum. The purposes of the switching devices F and 4 will become evident from subsequent description.

A further circuit is then completed from the master-controller contact segment 72, through conductor 85, train-line conductor 86, conductor 87, contact member 88 of the relay device 2, in its lower or deënergized position, interlocks J—in and Res. drum—$e$, contact disk 89 of the relay device 8, in its upper or energized position, the parallel-related actuating coils of the switches LS1, LS2 and M1, conductor 101, and contact member 102 of the relay device 7, to ground.

The energization of the actuating coils for the switching devices LS1, LS2 and M1 is maintained independently of the position of the resistance drum by means of an interlock LS2—in which directly connects conductor 87 with the contact member of the relay device 8.

Figures 4, 5:
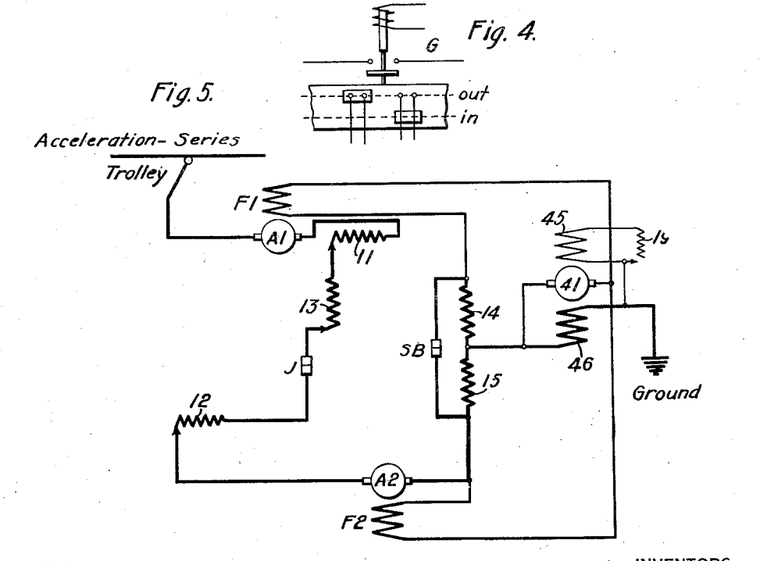
Fig. 4 is a detail diagrammatic view of a complete unit switch that is employed in our invention.
Fig. 5 to Fig. 8, inclusive, are simplified diagrammatic views illustrating the main-circuit connections during series and parallel acceleration and regeneration, in accordance with the accompanying designations.

The main-machine circuits at this period, corresponding to series acceleration, are depicted in a simplified manner in Fig. 5 and may be traced in Fig. 1 as follows: from the trolley through conductor 130, switches LS1 and M1, conductor 131, contact segment 132 of the cutout drum 18, conductor 133, main armature A1, conductor 134, contact segment 135 of the cutout drum, conductors 136 and 137, contact segment R1 of the resistance drum, the entire accelerating resistor 11, conductor 138, resistor 13, switch J, the entire accelerating resistor 12, contact segment RR1 of the resistance drum, conductor 139, relay shunt 56, contact segment 140 of the cutout drum, main armature A2, and contact segment 141 of the cutout drum, where the circuit divides, the main branch including conductor 142, stabilizing resistors 14 and 15, which are connected in parallel relation by the closure of the switch SB, junction-point 143, regulating resistor 16, which is short-circuited by the switch F, exciting field winding 46 for the auxiliary generating armature 41, and conductor 144 to ground.

The main field windings F1 and F2 are energized from the auxiliary generating armature 41, the circuit being established from one terminal thereof, through short-circuited resistor 16, junction-point 143, parallel-related stabilizing resistors 14 and 15, conductor 145, contact segment 146 of the cutout drum, conductor 147, and main field winding F1 to contact segment 148, while a similar circuit is completed from the stabilizing resistors, through conductor 142, contact segment 141 of the cutout drum, main field winding F2 and conductor 149 to the contact segment 148, whence a common circuit is completed through conductor 150, to the negative terminal of the auxiliary generating armature 41.

The driving circuit for the motor-generator set may be traced as follows: from the trolley through a suitable hand switch 151, where the circuit divides, one branch including the actuating coil of the relay device 8, and the other traversing conductor 152, auxiliary driving armature 40, field windings 43 and 45 for the driving and generating armatures, respectively, and thence to the negatively-connected conductor 144.

Upon movement of the master controller to its second position $n$, a new circuit is established from the intermediate tap 109 of the control resistor 61, through conductor 115, contact segment 116, resistance drum 20, conductor 117, actuating coil 34—$e$ to $l$, (the "forward-moving" coil for the resistance drum), interlocks M2—out and J—in, conductor 118, interlock LS1—in, contact segment 120 of the resistance drum, conductor 121, train-line conductor 122 and conductor 123, to the contact segment 72 of the master controller.

The resistance drum is thus actuated, through position $e$, to its second position $f$, where movement is arrested by reason of the disconnection of the conductor 121 from the contact segment 120.

By moving the master controller to its third position $o$, a circuit is completed from the contact segment 120 of the resistance drum, through conductor 124, train-line conductor 125, and conductor 126, to the master-controller contact segment 72, from which the previously-mentioned conductor 123 has been disconnected by movement to the position $o$. The actuating coil 34—$e$ to $l$ is thus again energized to effect movement of the resistance drum into its position $g$.

By successively moving the master controller to positions $p$, $q$ and $r$ and then to $q$ and to $r$ again, the actuating coil in question is intermittently energized to effect a step-by-step movement of the resistance drum to its final position $l$.

Such movement of the resistance drum short-circuits sections of the accelerating resistors 11 and 12, in alternation, while the resistor 13 is short-circuited in all drum positions except $e$, as will be evident from an inspection of the relative positions of contact segments R1 to R4, inclusive, JR, and RR1 to RR4, inclusive.

In the final position $r$ of the master controller, a further circuit is established from the contact segment 72 through conductor 160, train-line conductor 161, conductor 162, actuating coil 52—$a'$ to $q'$ of the field-regulating drum, interlock or auxiliary contact member Res. drum—$l$, provided the resistance drum has reached its final position, contact disk of the relay device 3, in its upper or energized position, conductor 163, contact segment 164 of the field-regulating drum, conductor 165, train-line conductor 166 and conductor 167 to the contact segment 83 of the master controller and thence to ground.

The field-regulating drum is thus actuated through position $a'$ to position $b'$, where the circuit of the actuating coil 52—$a'$ to $q'$ is interrupted by reason of the disconnection of conductor 165 from the contact segment 164. Thus, the resistor 19 is shunted across the field winding 45 for the auxiliary generating armature 41 to reduce the excitation thereof and thereby cause a lower voltage to be delivered from the auxiliary generating armature to the main field windings F1 and F2. Such action corresponds to the well-known "field-control," whereby a weakening of the main field-excitation produces an increased acceleration of the motors.

Further step-by-step movement of the field-regulating drum 50 to the transition position A is effected by oscillating the master controller between positions $q$ and $r$, a circuit being completed in position $q$ from the contact segment 83 through conductor 170, train-line conductor 171, and conductor 172 to the contact segment 164 of the field-regulating drum. The step-by-step action in question is similar to that employed in connection with the resistance drum 20, and no further explanation of the operation, as far as transition position A, is deemed necessary.

The series-parallel switch 60 is now thrown to its position marked "Parallel," whereupon a new circuit is continued from contact segment 72 of the master controller through conductor 85, train-line conductor 86, conductors 87 and 90, actuating coil of the relay device 2, train-line conductor 91, conductor 92, contact segment 93 of the series-parallel switch, conductor 94, and contact segment 95 of the master controller, where the circuit divides, one branch including conductor 96, contact segment 97 of the series-parallel switch and conductors 82 and 84 to ground, as previously described. The other branch includes conductor 98, train-line conductor 99, conductor 100, contact member CO—$a$ of the cutout drum, lower contact disk of the relay device 3, contact segment 164 of the field-regulating drum 50 in position A, conductor 163, upper contact disk of the relay device 3, in its closed or upper position, interlock or auxiliary contact member Res. drum—$l$, and thence through the actuating coil 52—$a'$ to $q'$, as previously described. The field-regulating drum 50 is thus carried to its transition position C, corresponding to position $r$ of the master controller, wherein the energizing circuit for the actuating coil 52—$a'$ to $q'$ is interrupted at the contact segment 164.

However, if the master controller MC is moved to position $q$, at this time, the field-regulating drum is actuated to position D, the actuating coil 52—$a'$ to $q'$ being again energized in position C of the field-regulating drum through contact segment 83 of the master controller, conductors 170, 171 and 172 and the contact segment 164 of the field-regulating drum. In either case, the strength of the auxiliary generator field winding 45, and, therefore, the main field strength, is held at its greatest value during the transition of the motors, which is a desirable condition.

Furthermore, contact segment 106 of the field-regulating drum becomes disconnected from conductor 111 and makes a new circuit with conductor 112 in passing between the transition positions A and B. The relay device 4 is thus deënergized and assumes its lower position, while the actuating coil of the relay device 5 is energized to lift the device to its upper position. The purposes of these circuits are explained later. They are not employed during the normal operation now being described.

A further circuit is completed from the positively energized conductor 75 through the parallel-related actuating coils of switches M2 and G, relay device 2, in its upper or energized position, contact segment Res. drum—l, conductor 112, contact segment 106 of the field-regulating drum and thence to intermediate tap 109 of the control resistor, as hereinbefore set forth. Upon the closure of switch G, the actuating coils for the switches J and SB are deënergized by reason of the exclusion from their circuit of the interlock G—out.

A holding circuit for the actuating coils of the switches M2 and G, rendering them independent of movement of the resistance drum, is formed by a connection of interlocks G—in and SB—out between the actuating coils in question and the conductor 107.

The actuating coil for the relay device 6 is deënergized by movement of the series-parallel switch to its parallel position, thereby preventing subsequent closure of the switches J and SB through the previously-traced circuit, including the auxiliary contact member of the relay device 6 and interlock Res. drum—e.

Another auxiliary circuit is established from the intermediate tap 109 of the control resistor 61, through conductor 115, contact segment 116, which, in position l of the resistance drum, is disconnected from "forward-moving" actuating coil 34—e to l, whence circuit is continued through the other or "reverse-moving" actuating coil 33—l to e, interlocks M2—in and J—out, conductor 118, interlock LS1—in, conductor 119, contact segment 120 of the resistance drum and conductor 124 to contact segment 72 of the master controller, which, at this time, is occupying its position q. The resistance drum is consequently actuated to its adjacent position k, wherein the circuit just traced is interrupted by the movement of the contact segment 120.

Figure 6:
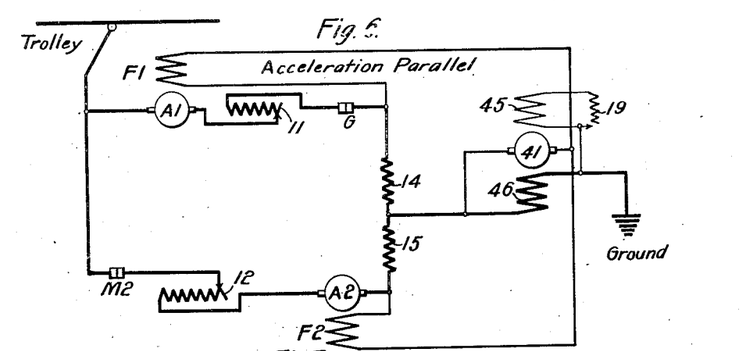

The main circuits, at the present stage of the motor operation, are illustrated in a simplified manner in Fig. 6 and may be traced in Fig. 1 as follows: from the trolley, through conductor 130, switches LS1 and M1 to conductor 136, as described in connection with the series operation, whence circuit is continued through contact segment R4 of the resistance drum, the entire resistor 11, through which current passes in the reverse direction from that taken by the series accelerating current, conductor 183, switch G, conductor 184, contact segment 146 of the cutout drum, conductor 145, and stabilizing resistor 14, which during parallel operation, is connected in series relation with the other stabilizing resistor 15 by reason of the opening of the switch SB, circuit being completed from stabilizing resistor 14 through resistor 16, which remains short-circuited by the switch F, except in positions m' to q', inclusive, of the field-regulating drum 50, as will be observed from the contour of the lowermost section of the contact segment 106. The resistor 16 is inserted in the common main-motor circuit under such high-speed conditions to insure a further stabilizing or balancing action with respect to maintaining a substantially constant regenerated current. The stabilizing action in question, as well as that obtained by the use of the resistors 14 and 15, is not of our present invention, but is fully shown and described in a copending application of R. E. Hellmund, Serial No. 44,443, filed August 9, 1915, and assigned to the Westinghouse Electric & Manufacturing Company. This application has matured into Patent No. 1,298,706, dated April 1, 1919.

The other and parallel-related main-motor circuit is continued from the positively-energized conductor 130, through switches LS2 and M2, accelerating resistor 12, which is traversed by current in the opposite direction from that taken during series operation, contact segment RR4 of the resistance drum, and thence, through conductor 139 and the main armature A2, as previously described, to conductor 142 and stabilizing resistor 15.

Since the exciting-field-winding connections are similar to those described in connection with series acceleration, except for the opening of the switch SB to interrupt the parallel connection of the stabilizing resistors 14 and 15, no further description thereof is believed to be required.

By actuating the master controller to its position r again, the conductor 123 is energized from the contact segment 72 and consequently, a circuit is completed through conductor 121, contact segment 120 of the resistance drum in position k, and thence through the actuating coil 33—l to e. Thus, by oscillating the master controller between positions q and r, step-by-step backward movement of the resistance drum is effected to gradually exclude sections of the resistors 11 and 12 from circuit in alternation, by reason of the peculiar arrangement of these resistors and the corresponding contact segments, as described above.

During the reverse movement of the resistance drum, the field-regulating drum 50 has remained in its transition position C or D, as previously explained, from which it may be forwardly actuated to the succeeding position j', by actuating the master controller to position $q$ or $r$ to energize the previously-mentioned conductor 172 or conductor 165 and the contact segment 164 of the field-regulating drum, whence circuit is continued through conductor 163, lower contact disk of the relay device 3 in its lower or deënergized position, interlock Res. drum—$e$, provided that the resistance drum has been returned to its position $e$ in the manner described above, and thence through "forward-moving" coil 52—$a'$ to $q'$, in accordance with the previously-traced circuits.

By again oscillating the master controller MC between positions $q$ and $r$, the remaining steps of the field-regulating drum 50 may be taken in the manner already described to gradually decrease the voltage delivered by the auxiliary generating armature 41 and, consequently, weaken the field excitation of the main motors to increase their speed.

To effect regenerative operation of the main machines, at the present stage of the operation, it is merely necessary to return the master controller to its position $p$, whereby a circuit is established from the contact segment 72, through conductor 190, train-line conductor 191, conductor 192, "reverse-moving" actuating coil 53—$q'$ to $a'$ of the field-regulating drum, conductor 163, contact segment 164, and thence, through conductors 175, 174 and 173, to the contact segment 83 of the master controller. The field-regulating drum 50 is thus returned to its position $p'$, wherein the circuit just traced is interrupted at the contact segment 164.

Further step-by-step reverse movement of the field-regulating drum is then accomplished by oscillating the master controller between positions $o$ and $p$, the conductor 170 being energized, in position $p$, to effect energization of the actuating coil 53—$q'$ to $a'$ of the field-regulating drum and, therefore, backward movement to position $o'$ thereof while conductor 167 is similarly energized, in position $o$ of the master controller, to effect backward movement of the field-regulating drum to position $n'$, for example.

Figure 7:
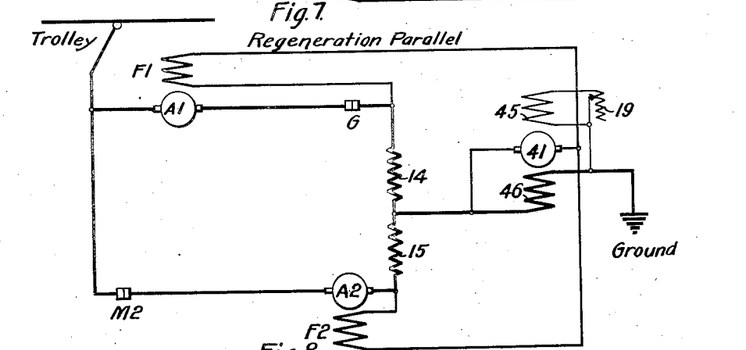

The initial or parallel regenerative connections are illustrated in a simplified manner in Fig. 7, whereby it will be seen that the only differences between the main-circuit connections for parallel acceleration and parallel regeneration reside in the exclusion of the resistors 11 and 12 from circuit throughout the parallel regenerative operation, while the field flux that is emitted by the auxiliary-generator field winding 45 is gradually increased, through the agency of the variable resistor 19, to so strengthen the main field windings that the voltage of the main machines is maintained slightly above that of the supply circuit to thus effect regeneration thereto.

The field-regulating drum is actuated, in the manner described, as far as transition position B. Further movement to initial series position $i'$ is effected, as soon as the series-parallel switch 60 has been actuated to the corresponding position "Series," through a circuit including the conductor 78, interlock Res. drum—$e$, relay device 3 in its lower or deënergized position, contact segment 164 and the "reverse-moving" actuating coil 53—$q'$ to $a'$. In this way, the strength of the exciting field winding 45 for the auxiliary-generator armature 41 and, therefore, the main field strength, is maintained in its weakest state during the transition from parallel to series relation of the main armatures, which is a desirable condition.

Figure 3:
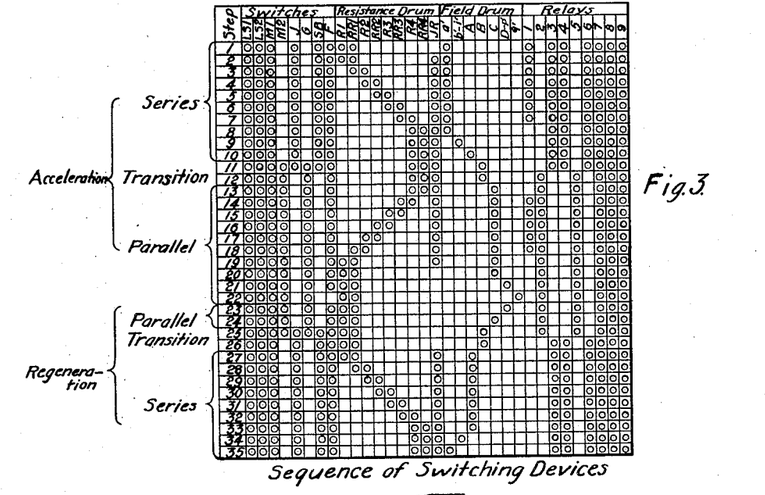
Fig. 3 is a sequence chart of well-known form serving to set forth the preferred order of operation of the various illustrated switches and relay devices.

This transition is effected, after throwing the series-parallel switch to its series position, by means of the contact segment 106 of the field-regulating drum 50, whereby the switches J and SB and the relay devices 3 and 4 are closed and the switches M2 and G are then opened. In general, the same main-circuit connections are established as was the case for series acceleration, as will be evident from an inspection of the simplified diagram, Fig. 8, and of the corresponding portion of the sequence chart, Fig. 3.

Figure 8:
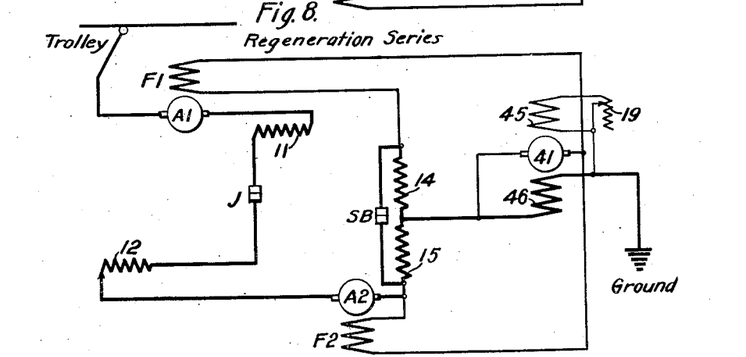

Step-by-step reverse movement of the resistance drum 20 is then effected by oscillating the master controller between positions $o$ and $p$ to alternately energize conductors 126 and 123, corresponding to conductors 124 and 121, which are directly connected to the contact segment 120 of the resistance drum. The drum is thus gradually moved toward its final position $l$ to smoothly exclude the resistors 11 and 12 from circuit, as indicated in Fig. 8.

The "reverse-moving" actuating coil 53—$q'$ to $a'$ of the field-regulating drum is again intermittently energized, as the master controller is thus oscillated between positions $o$ and $p$ to produce a step-by-step movement of the drum toward position $a'$, in the manner previously described. The main field is, in this way, strengthened simultaneously with the exclusion of the resistors from circuit in order to maintain a desirably high regenerated current. The temporary insertion of the resistors in circuit is, however, necessary in changing over from full to weakest main-field excitation (positions $j'$ to A) to prevent a jerky transition.

In this way, the excitation of the main field windings is gradually increased, by similarly increasing the active value of the resistor 19, during both the parallel and the series portions of the regenerative period, and regeneration of energy to the supply circuit is continued until a relatively low speed is reached, when the machines are changed from generators to motors without any attention upon the part of the train operator and without shock or injury of any kind to the apparatus.

The foregoing description sets forth the normal operation of the system when the resistance drum 20 occupies its initial position $e$ and the field-regulating drum 50 occupies its initial position $a'$ at the start of the accelerating or motoring period, and when these drums respectively occupy positions $e$ and $q'$ at the beginning of the regenerative operation. However, it will be understood that various other conditions will naturally obtain during the operation of a locomotive over a long stretch of track involving stops, various up and down grades, etc.

We have, therefore, provided the various circuits now to be described for successfully taking care of any possible condition in which the system may be operated, to prevent false or injurious operation of any sort and thus render the system substantially "fool-proof" without requiring a high degree of intelligence or any extended consideration upon the part of the train operator.

In particular, while the resistance drum 20 is provided with means for automatically returning the drum to the position of maximum circuit resistance, relative to the position of the field-regulating drum, the latter is not provided with any such automatic returning system since to do so would serve no good purpose, inasmuch as the next operation of the main motors might require the initial positioning of the field-regulating drum in either position $a'$ or C (strongest main-field excitation) or in positions A or $q'$ (weakest main-field excitation). Consequently, the field-regulating drum 50 is allowed to remain in whatever position it happens to occupy when the last operation of the main machines, during either acceleration or regeneration, was terminated.

Furthermore, if the locomotive is standing on a down-grade, regeneration from such standstill condition may be initially effected without requiring the previously described accelerating operation.

For all of these reasons, the subsequently-described interlocking circuits are provided for the above-mentioned purpose of automatically preventing false operation of circuits or injury to the apparatus.

The specific operation of the torque relay device 1 may be set forth as follows. Whenever the ratio of armature-current to field-winding current reaches a certain value during the resistance-varying portions of the accelerating period corresponding to positions $m$ and $n$ of the master controller, the relay device is actuated to its position Acc., whereby a circuit is established from the "reverse-moving" actuating coil 53—$q'$ to $a'$ of the field-regulating drum through contact segment 195 of the relay device in its position Acc., and thence through train-line conductor 196 and conductor 197, to the master-controller contact segment 72, thus completing an energizing circuit for the coil mentioned to effect a backward or field-strengthening movement of the field-regulating drum. In this way, the above-mentioned ratio of armature and field currents is reduced to the desired normal value.

A similar action may occur when the field-regulating drum occupies transition positions A or B, during a starting operation, by reason of the connection of contact member 200 in circuit with the contact segment 164 of the field-regulating drum, as will be understood without detailed tracing of the circuits.

On the other hand, movement of the relay device to its position marked "Reg." during the beginning of regeneration from standstill, corresponding to the same positions $m$ and $n$ of the master controller, or the transition positions, effects the energization of the "forward-moving" coil 52—$a'$ to $q'$ to effect a forward or field-weakening movement of the drum and thus preserve the desired ratio between the main-armature and field currents.

The relay device 2 is employed for the general purpose of first properly positioning the field-regulating drum 50 to provide weak or strong main-field excitation, dependent upon the position of the series-parallel switch 60, and to prevent the line switches and the corresponding "parallel-connecting" switches M2 and G from closing until the desired position of the field-regulating drum is attained.

For example, let it be assumed that the field-regulating drum occupies some "parallel" position, that is, a position between B and $q'$, and it is desired to start series operation, to accomplish which the series-parallel switch 60 has been thrown to its "series" position. In this case, the actuating coil of the relay device 2 is deënergized by reason of the interruption of its circuit at the series-parallel switch and, consequently, energy is conducted from the master controller contact segment 72 through conductors 85, 86 and 87, contact disk 88 of the relay device 2 in its lower position, interlock J—out, contact disk of the relay device 4 in its lower position, (the relay device 4 is energized only in the series positions of the field-regulating drum), whence circuit is completed through the "reverse-moving" actuating coil 53—$q'$ to $a'$ of the field-regulating drum which is thus returned to the series position A by the previously-described manipulation of the master controller, employing either positions q and r, or positions o and p, in alternation.

In an analogous manner, if the field-regulating drum has been left in some series position between a' and A and it is desired to connect the machines in parallel relation, the series-parallel switch 60 is thrown to its "parallel" position, whereby the relay device 2 is energized and lifted to its upper position to complete a circuit from the positively energized conductor 87 through the upper contact disk of the relay device 2 in its raised position and thence through interlock G—out and contact disk of the relay device 5 in its lower position (this relay device being deënergized when the field-regulating drum occupies any series position), whence circuit is completed through the "forward-moving" actuating coil 52—a' to q' of the field-regulating drum and interlock LS1—out as the master controller is operated in the above-mentioned manner. The field-regulating drum may thus be actuated to parallel position B, by actuation of the master controller in the manner already described.

Since the "series-connecting" switches J and SB cannot be closed except when the field-regulating drum occupies some series position and the "parallel-connecting" switches M2 and G cannot be closed unless the drum occupies some one of its parallel positions, as will be evident from an inspection of the contact segment 106 of the drum, it follows that the switches mentioned cannot be closed until the field-regulating drum occupies a corresponding position. Furthermore, the closure of the line switches LS1 and LS2 is dependent upon the previous closure of the switches J or G, as the case may be, as indicated by the insertion of interlocks J—in and G—in in the circuit of the actuating coils of the line switches. In addition, a contact disk of the relay device 2 is included in series-circuit relation with the actuating coils of the switches M2 and G, which can thus be closed only when the relay device occupies its upper position, corresponding to parallel relation of the main machines.

Consequently, the relay device 2 first operates to actuate the field-regulating drum either to what may be termed the first multiple position B or what may be designated as the last series position A, according to the position of the series-parallel switch 60; and the "parallel-connecting" switches M2 and G and the line switches LS1 and LS2 are prevented from closing until the desired position of the field-regulating drum is secured.

The relay device 4 is provided with a contact disk that is connected in series relation with the "reverse-moving" actuating coil 53—q' to a' in the above-traced circuit for the following reasons: Assuming that the field-regulating drum has been left in some "parallel" position, that the series-parallel switch has been actuated to its "series" position, and that the master controller is oscillated between positions o and p, or q and r, if the interlock J—out were alone connected in series with the actuating coil mentioned, the energization of that coil would continue until the resistance drum, which is provided with an automatic electrically-controlled return in a manner to be described below, had returned to its initial position e to permit the closure of the switch J and, therefore, the exclusion of the interlock J—out from the circuit of the "reverse-moving" actuating coil 53—q' to a'. However, by employing the relay device 4, which becomes energized as soon as the field-regulating drum reaches series position A, the circuit of the actuating coil in question is thus interrupted by the lifting of the relay device 4 to hold the drum in position A and prevent it from returning to the initial position a', which position corresponds to strong main-field excitation and is the opposite of the condition required during initial regenerative conditions.

In a similar manner, the relay device 5 prevents the field-regulating drum from being actuated to its final parallel position q' and stops the drum in its position B when the previously-described circuit through the "forward-moving" coil 52—a' to q', interlock G—out and the relay device 2 is employed, as will be understood without detailed explanation.

A function of the relay device 6, in addition to those already pointed out, may be set forth as follows: Assuming that the field-regulating drum 50 has been left in some "series" position, and the series-parallel switch 60 has been thrown to its "parallel" position to effect corresponding machine operation, the actuating coils for the switches J and SB cannot be energized, by reason of the gap in their circuit that is caused by the relay device 6 occupying its lower or deënergized position. The relay device is energized only when the series-parallel switch occupies its "series" position and, consequently, the desired protective interlocking is thus provided.

The previously-mentioned automatic-returning feature of the resistance drum 20 may be described as follows: Whenever the field-regulating drum 50 occupies any of its series positions a' to A, inclusive, at the beginning of an operating period, a circuit is established from intermediate tap 109 of the control resistor 61, through conductor 115, contact segment 116 of the resistance drum 20 in any position except e, whence circuit is continued through "reverse-moving" actuating coil 33—l to e, conductor 205, contact segment 207 of the field-regulating drum, conductor 208 and interlock LS2—out to another intermediate tap 65 of the control resistor. The resistance drum 20, unless already occupying its position $e$, is thus automatically actuated to that position upon the return of the master controller to its "off" position, with the consequent opening of the line switch LS2.

A similar operation occurs when the field-regulating drum occupies any one of its "parallel" positions B to $q'$, in which case a circuit is established from the contact segment 116 of the resistance drum in any position but $l$, through conductor 117, "forward-moving" actuating coil 34—$e$ to $l$, conductor 206, and thence through contact segment 207 of the field-regulating drum, as already traced. It will thus be seen that the resistance drum is automatically returned to the end position that corresponds to the insertion of maximum resistance in the circuit for either series or parallel machine operation, namely, positions $e$ and $l$, respectively, whenever the line switches are opened by returning the master controller to its "off" position.

The purpose of that portion of the contact segment 164 of the field-regulating drum that makes connection with conductor 175 may be stated as follows: If a small segment in line with conductor 165 were employed, as might be naturally expected, and, if the master controller occupies its position $r$ and the series-parallel switch 60 is thrown to its "series" position at the beginning of a regenerative period when the field-regulating drum occupies its position $q'$, the "reverse-moving" actuating coil 53—$q'$ to $a'$ will be energized through the relay devices 2 and 4 and the assumed contact segment. Likewise, the other actuating coil 52—$a'$ to $q'$ will be energized through a circuit including the assumed contact segment, conductor 163, relay device 3 in its lower position, interlock Res. drum—$e$, the actuating coil in question, conductor 162, train-line conductor 161 and conductor 160 to the master-controller contact segment 72.

In this way, both actuating coils for the field-regulating drum are energized and, consequently, both operating cylinders are drained of high-pressure air. If the master controller is then actuated to its initial regenerative position $p$, both actuating coils are deënergized by reason of the interruption of their circuit at the contact segment 83 of the master controller. The sudden rush of high-pressure air against the differently-positioned pistons in the respective cylinders causes the operating mechanism 51 for the field-regulating drum to rapidly move into some intermediate position, since the admission of high air-pressure into both operating cylinders prevents the operating mechanism from being arrested in position $p'$, when the conductor 172 is energized through the contact segment 164. To prevent this undesirable over-shooting of the field-regulating drum, the conductor 175 and an additional portion of the contact segment 164 are employed in the manner described in connection with the normal regenerative operation of the system.

The purpose of the intermediate portions of the contact segment 164 of the field-regulating drum that are located opposite conductors 175 and 210 in positions A and B, respectively, of the drum, may be set forth as follows. In case the train operator has manipulated the field-regulating drum during the accelerating period from initial position $a'$ to position C, in the previously described manner, thus effecting the transition of the motors to parallel relation, next decides to return the machines to series relation by moving his master controller into position $p$, and then again actuates the master controller to position $q$, the previously-described normal transitional movement of the field-regulating drum into position C, employing the lower contact disk of the relay device 3 and conductor 100, cannot be repeated, since the relay device 3 now occupies its lower or open-circuit position, in so far as conductor 100 is concerned. However, in this case, a new circuit is established from the master-controller contact segment 83 through conductor 180, train-line conductor 181, conductor 210 and a portion of the contact segment 164 of the field-regulating drum, to the "forward-moving" actuating coil 52—$a'$ to $q'$, whereby the drum is carried through its transitional position into position C, and the regular progressive operation thereof may be continued, as already set forth.

The corresponding portion of the contact segment 164 that is located opposite conductor 175 is employed for an analogous purpose, in the case of regenerative operation, when the field-regulating drum is first actuated, in the normal way, from position $q'$ to position $i'$, thus effecting the transition to series relation of the motors, next back to transition position A by movement of the master controller to position $q$, the master controller being then again actuated to position $p$. In this case, the relay device 3 occupies its upper or energized position to interrupt connection between conductor 78 and contact segment 164, which interruption would prevent movement of the field-regulating drum back to position $i'$, were it not for the additional portion of the contact segment 164 that energizes conductor 175 to permit the desired movement.

We do not wish to be restricted to the specific circuit connections or arrangement of parts herein set forth, as various modifications thereof may be made without departing from the spirit and scope of our invention. We desire, therefore, that only such limitations shall be imposed as are indicated in the appended claims.

We claim as our invention:

1. In a system of control, the combination with a dynamo-electric machine adapted for both acceleration and regeneration, of movable means for governing the operation thereof, and plural-position controlling means for effecting step-by-step movement of said movable means in the one and in the other direction, respectively, when oscillated between two different sets of positions.

2. In a system of control, the combination with a dynamo-electric machine adapted for both acceleration and regeneration and provided with an armature and a field winding, of separate means for governing the armature-circuit resistance and the field excitation, and plural-position controlling means for effecting successive step-by-step movements of said separate means to respectively effect the two types of operation when oscillated between two different sets of positions.

3. In a system of control, the combination with a dynamo-electric machine adapted for both acceleration and regeneration and provided with an armature and a field winding, of separate controllers for governing the armature-circuit resistance and the field excitation, and a master controlling device oscillatable between two of its positions to successively effect forward movement of both controllers, reverse movement of one and further forward movement of the other and oscillatable between two other positions to successively effect two reverse movements of one controller separated by a forward movement of the other.

4. In a system of control, the combination with a supply circuit and a dynamo-electric machine, of a controller having two portions corresponding to different types of machine operation for regulating a circuit of said machine, means for connecting the machine to said supply circuit, and means for effecting movement of said controller in the one or the other direction toward certain positions before said connecting means can be closed.

5. In a system of control, the combination with a supply circuit and a plurality of dynamo-electric machines adapted for series-parallel operation, of a master switch having positions respectively corresponding to series and to parallel operation, a controller having two portions respectively corresponding to such operations for regulating a circuit of said machine, a plurality of switching devices for connecting the machines to said supply circuit, and a relay device associated with said master switch and said controller for effecting movement of said controller to a position corresponding to that of said master switch before said switching devices can be closed.

6. In a system of control, the combination with a supply circuit and a plurality of dynamo-electric machines adapted for series-parallel operation, of a master switch having positions respectively corresponding to series and to parallel operation, a controller having two portions respectively corresponding to such operations for regulating a circuit of said machine and also having two normally deënergized actuating coils for effecting movement of the controller in the one or the other direction, a plurality of switching devices for connecting the machines to said supply circuit, a relay device governed by said master switch to energize the one or the other of said actuating coils to effect movement of the controller to a position corresponding to that of the master switch, and means dependent upon such movement for effecting the closure of said switch devices.

7. In a system of control, the combination with a dynamo-electric machine, of a controller having two portions corresponding to different types of machine operation for regulating a circuit of said machine, a master switch provided with positions respectively corresponding to said different types of operation, means for effecting movement of said controller in the one or the other direction in accordance with the position of said master switch, and means for arresting said movement in predetermined positions of said controller.

8. In a system of control, the combination with a plurality of dynamo-electric machines adapted for series-parallel operation, of a master switch having positions respectively corresponding to series and to parallel operation, a controller having two portions respectively corresponding to such operations for regulating a circuit of said machine, a relay device associated with said controller and said master switch for effecting movement of said controller in a direction corresponding to one position of said switch, and a relay device for arresting said movement when the controller has reached a certain position.

9. In a system of control, the combination with a plurality of dynamo-electric machines adapted for series-parallel operation, of a master switch having positions respectively corresponding to series and to parallel operation, a controller having two portions respectively corresponding to such operations for regulating a circuit of said machine, and also having two normally deënergized actuating coils for effecting movement of the controller in the one or the other direction, a relay device governed by said master switch to energize the one or the other of said actuating coils to effect movement of the controller to a position corresponding to that of the master switch, and a plurality of relay devices respectively excluded from the active-coil circuit when the controller reaches certain positions.

10. In a system of control, the combination with a dynamo-electric machine, of a controller having two portions corresponding to different types of machine operation for regulating a circuit of said machine, a master switch provided with positions respectively corresponding to said different types of operation, a switching device corresponding to only one type of operation, and means for preventing the closure of said switching device when the controller occupies a position corresponding to the other type of operation.

11. In a system of control, the combination with a plurality of dynamo-electric machines adapted for series-parallel operation, of a master switch having positions respectively corresponding to series and to parallel operation, a controller having two portions respectively corresponding to such operations for regulating a circuit of said machine, a switching device corresponding to series machine operation only, and a relay device associated with said master switch for preventing the closure of said switching device when the controller occupies a position corresponding to parallel machine operation.

12. In a system of control, the combination with a plurality of dynamo-electric machines adapted for different operating connections, of a controller having a position for effecting the transition from the one to the other connection, manual means for actuating the controller as far as the transition position, and automatic means for carrying the controller just beyond that position to effect a different connection of said machines.

13. In a system of control, the combination with a plurality of dynamo-electric machines adapted for series and parallel connections, of a controller having an intermediate position for effecting the transition from the one to the other connection, manual means for actuating the controller as far as the transition position, and a relay device having two positions for respectively effecting the movement of the controller in opposite directions just beyond the transition position to effect a different connection of said machines.

14. In a system of control, the combination with a plurality of dynamo-electric machines adapted for series and parallel connections, of a controller having an intermediate position for effecting the transition from the one to the other connection, manual means for actuating the controller as far as the transition position, and a relay device governed in accordance with the controller position to have an energized and a deenergized position for respectively effecting the movement of the controller in opposite directions just beyond the transition position to effect a different connection of said machines.

15. In a system of control, the combination with a plurality of dynamo-electric machines adapted for series and parallel connections, of a controller having an intermediate position for effecting the transition from the one to the other connection and provided with a plurality of actuating coils for effecting controller movement in the one or the other direction, manual means for actuating the controller as far as the transition position, and a relay device provided with an actuating coil governed in accordance with the controller position to have an energized and a deënergized position for respectively exciting said controller-actuating coils to produce controller movement just beyond the transition position and effect a different connection of said machines.

16. In a system of control, the combination with a plurality of dynamo-electric machines adapted for series and parallel connections, of a controller having two sets of circuit-regulating positions and an intermediate position for effecting the transition from the one to the other connection, means for varying the machine-circuit resistance, and means for preventing the movement of said controller through either set of regulating positions unless said resistance-varying means is in condition to provide maximum circuit-resistance.

17. In a system of control, the combination with a plurality of dynamo-electric machines adapted for series and parallel connections, of a controller having two sets of circuit-regulating positions and an intermediate position for effecting the transition from the one to the other connection, a second controller for varying the machine-circuit resistance, and means comprising a contact member corresponding to a maximum circuit-resistance position of said second controller and a relay device governed by the other controller for preventing the movement thereof through either set of regulating positions unless said second controller occupies said maximum circuit-resistance position.

18. In a system of control, the combination with a plurality of dynamo-electric machines adapted for series and parallel connections, of a controller having two sets of circuit-regulating positions and an intermediate position for effecting the transition from the one to the other connection and provided with a plurality of actuating coils for effecting controller movement in the one or the other direction, a second controller for varying the machine-circuit resistance, and means comprising contact members respectively corresponding to the end or maximum circuit-resistance positions of said second controller and a relay device having an actuating coil energized or deënergized in accordance with the position of the first-named controller to have a plurality of contact-making positions acting in conjunction with said contact members for preventing the movement of the first-named controller through either set of regulating positions unless said second controller occupies the proper end position.

19. In a system of control, the combination with a plurality of dynamo-electric machines adapted for series and parallel connections, of a controller having an intermediate position for effecting the transition from the one to the other connection, means for actuating the controller as far as the transition position to regulate the machine excitation, and means for maintaining a predetermined machine excitation during the machine transition.

20. In a system of control, the combination with a plurality of dynamo-electric machines adapted for series and parallel connections, of a controller having two sets of machine-excitation-regulating positions and having an intermediate position for effecting the transition from the one to the other connection, manual means for actuating the controller as far as the transition position in the one or the other direction to respectively weaken and strengthen said machine excitation, and automatic means for maintaining a predetermined strong excitation during transition to the one connection and a predetermined weak excitation during transition to the other connection.

21. In a system of control, the combination with a plurality of dynamo-electric machines adapted for series and parallel connections during both acceleration and regeneration, of a controller having two sets of machine-excitation-regulating positions and having an intermediate position for effecting the transition from the one to the other connection, manual means for actuating the controller as far as the transition position in the one or the other direction to respectively weaken the machine excitation during acceleration and strengthen it during regeneration, and automatic means for maintaining a predetermined strong excitation during accelerating transition and a predetermined weak excitation during regenerative transition.

22. In a system of control, the combination with a dynamo-electric machine, of a controller having two portions respectively corresponding to two different types of machine operations, further circuit-regulating means, means for actuating said controller to various positions in either of said portions, and means dependent upon the position of said controller when a machine operation is terminated for placing said circuit-regulating means in a certain condition.

23. In a system of control, the combination with a dynamo-electric machine, of a controller having two portions respectively corresponding to two different types of machine operation, a second controller for regulating a machine circuit, means including a master controller for actuating the first-named controller to various positions in either of said portions, and means rendered active by the return of said master controller to its "off" position and dependent upon the contemporaneous position of said first-named controller for actuating said second controller to the one or the other of certain positions.

24. In a system of control, the combination with a plurality of dynamo-electric machines adapted for series and parallel connection, of a controller having two portions respectively corresponding to such connections, a second controller for regulating machine-circuit resistance, means for actuating the first-named controller to various positions in either of said portions, and means responsive to an interruption of the machine circuit and dependent upon the contemporaneous position of said first-named controller for actuating said second controller to the one or the other of certain positions corresponding to maximum circuit-resistance for said contemporaneous controller position.

25. In a system of control, the combination with a supply circuit and a plurality of dynamo-electric machines adapted for series and parallel connection, of a machine-excitation-varying controller having two portions respectively corresponding to such connections, a second controller for regulating the machine-circuit resistance and having actuating coils for effecting controller movement in the one or the other direction, means for actuating the excitation-varying controller to any desired position in either of said portions, switches for connecting the machines to said supply circuit, and means responsive to the opening of said switches and dependent upon the contemporaneous position of said excitation-varying controller for energizing the one or the other of said actuating coils to actuate said second controller to one or the other end position corresponding to maximum circuit-resistance for said contemporaneous controller position.

26. In a system of control, the combination with a plurality of dynamo-electric machines adapted for series and parallel connection, of a regulating controller having two portions respectively corresponding to such connections and having an intermediate position for effecting the machine transition, of means comprising a master controller and a relay device governed in accordance with the regulating-controller position for respectively effecting progressive movement of that controller to and beyond, and automatic movement through, said transition position under normal operating conditions of the master controller, and means comprising additional contact segments and conductors for replacing said relay device when the regulating controller has been returned to said transition position to permit forward movement therefrom.

27. In a system of control, the combination with a plurality of dynamo-electric machines adapted for series and parallel connection, of a regulating controller having two portions respectively corresponding to such connections and having an intermediate position for effecting the machine transition, of means comprising a master controller and a relay device having an actuating coil energized or deënergized in accordance with the occupation of a series or a parallel position by said regulating controller for respectively effecting progressive movement of that controller to and beyond, and automatic movement through, said transition position in either direction under normal operating conditions of the master controller, and means comprising additional contact segments and conductors for replacing said relay device when the regulating controller has been returned to said transition position from the one or the other of said portions to respectively permit the necessary forward or backward movement to reach the desired portion corresponding to progressive operation.

28. In a system of control, the combination with a plurality of dynamo-electric machines adapted for two different types of operation, of movable control means therefor, and a plural-position master device for effecting movement of said movable means in the one and in the other direction, respectively, when oscillated between two different sets of positions.

29. In a system of control, the combination with a plurality of dynamo-electric machines adapted for two different types of operation, of a controller having a plurality of sets of circuit-regulating positions and another position for effecting the change from the one to the other type of operation, means for varying the machine circuit resistance, and means for preventing the movement of said controller through either set of regulating positions unless said resistance-varying means is in condition to provide a predetermined amount of resistance.

30. In a system of control, the combination with a plurality of dynamo-electric machines adapted for two different types of operation, of a controller having a plurality of sets of circuit-regulating positions and another position for effecting the change from the one to the other type of operation, means for actuating the controller as far as the changeover position to regulate the machine excitation, and means for maintaining a predetermined machine excitation during such change.

In testimony whereof, we have hereunto subscribed our names this 19th day of Feb., 1919.

ARTHUR J. HALL.
PAUL L. MARDIS.